(No Model.)
E. JORDAN.
FRICTION CLUTCH.
No. 329,393. Patented Oct. 27, 1885.
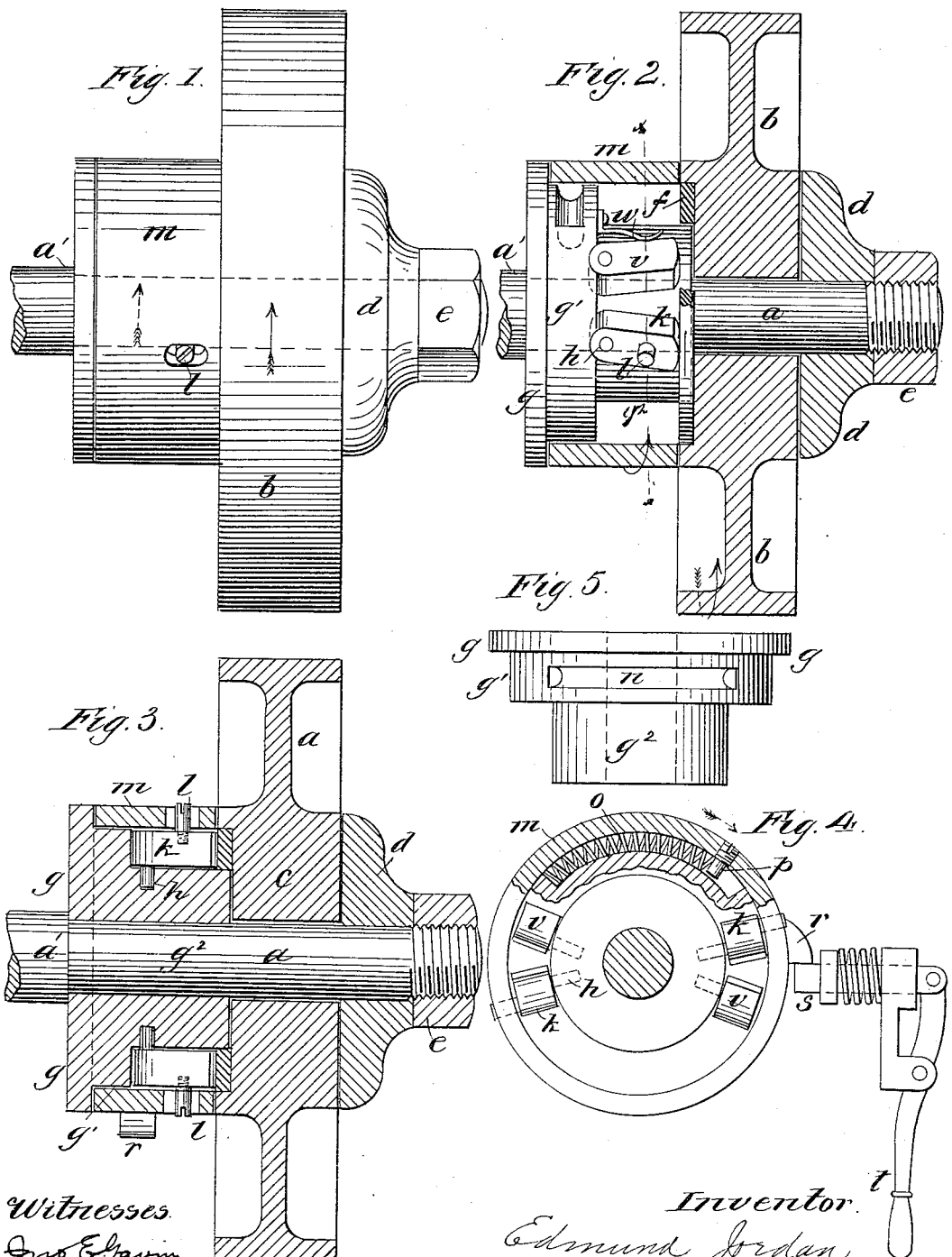
Witnesses
Jno. E. Gavin
H. C. Kudlich
Inventor
Edmund Jordan
by Chas. M. Higgins
Attorney

UNITED STATES PATENT OFFICE.

EDMUND JORDAN, OF BROOKLYN, NEW YORK.

FRICTION-CLUTCH.

SPECIFICATION forming part of Letters Patent No. 329,393, dated October 27, 1885.

Application filed April 20, 1885. Serial No. 162,862. (No model.)

*To all whom it may concern:*

Be it known that I, EDMUND JORDAN, of Brooklyn, Kings county, New York, have invented certain new and useful Improvements in Friction-Clutches, of which the following is a specification.

My improved form of clutch is more especially designed for die-presses in which the fly-wheel is the driver, while the shaft connected with the plunger of the die is driven when the fly-wheel is clutched to the shaft; but my improved clutch is not confined to this application, and may be applied to various forms of machinery, whether the wheel or the shaft is the driver or driven.

My improved clutch employs friction-pawls or wedging toggle-links, and a peculiarity of my invention is, that whereas heretofore the clutching devices act radial to the shaft and wheel, my clutching devices act longitudinally or press the hub of the wheel endwise or in a longitudinal axial direction against a flat abutting collar fixed on the shaft, and thus frictionally clutches the wheel to the shaft by a pressure in line with their axis. In my invention, therefore, the wheel revolves freely on the shaft, with one side of its hub revolving close to a friction-collar fixed on the shaft, and the opposite face of the hub revolving close to the curved ends of inclined friction-pawls or wedging toggle-links which are pivoted on a second or abutting collar fixed on the shaft. A ring encircling the latter collar is engaged with the links for operating the same, so as to wedge or unwedge the same to or from the hub of the wheel. This ring is constantly forced around by a spring in a direction to wedge or tighten the links, but is normally restrained by the engagement of a projection on the periphery of the ring with a sliding stop, to be manipulated by the operator, so that the ring is held from turning and the links held in a relaxed, inclined, and inactive position. If, however, the stop be withdrawn, the ring will be projected by its spring partly around the abutting collar, which will thus tend to straighten the links, and thereby wedge them against the hub of the revolving wheel, the engagement of which will at once tend to further straighten the links, which, reacting longitudinally, will wedge the hub of the wheel powerfully against the opposite friction-collar, and thus clutch the wheel to the shaft in an almost positive manner, and thus cause the shaft and its different collars and their attachments to revolve bodily with the wheel. If the stop is again thrown out in the path of the projection, the ring will be arrested at a definite point in the revolution against the stress of its spring, and the links will be relaxed and inclined, and the clutch thus released, permitting the wheel to revolve freely as before, while the shaft, with its collar and attachments, remains stationary. My invention therefore consists in the features above outlined, as hereinafter fully set forth.

In the drawings annexed, Figure 1 presents an elevation or external view of my improved clutch and its connections. Fig. 2 is a vertical central section of the same, and Fig. 3 a horizontal central section or sectional plan. Fig. 4 is a cross-section on $x\ x$, looking to the left. Fig. 5 is a plan view of the abutting collar which supports the wedging links or pawl and their operating-ring.

In the drawings, $a$ indicates the shaft, and $b$ the wheel or other part, which are to be clutched together. Either the shaft or wheel may be the driver or driven. In this case, however, I shall assume that the wheel is the driver and the shaft the driven, the wheel being, say, the fly-wheel of a die-press, to which a constant rotary motion is imparted, while the shaft $a$ is the main shaft of the press, connected with the die-plunger, and to which an intermittent rotary motion is imparted by clutching it to the wheel at intervals, so as to produce the proper stamping action of the press. The fly-wheel $b$ is in this case made with a broad and solid hub, $c$, which revolves closely to a heavy collar, $d$, fixed or keyed on the outer end of the shaft, and secured from displacement by the heavy nut $e$, screwed on the end of the shaft. The approaching faces of the collar $d$ and hub $c$ are planed true and smooth, and preferably on a flat or level plane, as shown, although they might be conical or spherical, one convex and the other concave; but the flat meeting faces are much preferable. The opposite side of the hub $c$ is recessed with an annular recess, in which is socketed a hardened-steel ring, $f$, and on this side of the hub a second heavy collar, $g$, is fixed to the shaft, up against an abutting shoulder, $a'$, thereon, as shown best in Figs. 2 and 3. This collar $g$, I shall term the "abutting collar," in distinction from the collar $d$, which I term the "friction-collar." The abutting collar $g$ is formed with a rim, $g'$, and neck $g^2$, and two friction-pawls or wedging toggle-links, $k\ k$, are pivoted on the abutting collar on each side of the neck $g^2$, and up against the rim $g'$, as best shown in Figs. 2 and 3. These pawls $k$ are pivoted on pins $h$, and have rounded bases concentric with said pins, which rest in rounded sockets on the rim $g'$, thus forming a broad pivotal bearing for the pawls, as will be readily appreciated. The engaging ends of the pawls have a rounded or cam-like face on a curve which is somewhat eccentric to the pivots, and these rounded faces closely approach or loosely contact with the face of the ring $f$ in the hub of the fly-wheel, as fully shown in Figs. 2 and 3. Around the rim $g'$ of the abutting collar is placed a ring or sleeve, $m$, which encircles the main part of the collar, inclosing and protecting the pawls $k\ k$, and the exterior of the ring is flush with the widest part of the collar and with the rim of the fly-wheel hub, as best shown in Figs. 1, 2, and 3. This ring $m$ is engaged with the pawls $k\ k$ on opposite sides by short screws $l$, which pass through short slots in the ring and screw into the pawls near the cam ends thereof, as shown in Figs. 1, 2, 3, and 4. A groove, $n$, is formed in the rim $g'$ of the abutting collar, as shown in Figs. 2 and 5, in which is placed a spring, $o$, which bears at one end against the end of the groove, and at the other end against a projection, $p$, on the ring $m$, thus tending constantly to turn the ring in the direction of the arrow shown in Fig. 4, which is the same direction as that in which the fly-wheel revolves, and is also the direction which will straighten and wedge the pawls against the hub of the fly-wheel, as indicated in Fig. 2. The ring is, however, normally restrained from turning, and thereby wedging or straightening the links against the fly-wheel, by reason of a projection, $r$, on its periphery, which engages a sliding stop, $s$, protruding in its path of rotation, as shown in Fig. 4, which stop is operated by a hand or foot lever, $t$, or other operating or manual device under the control of the operator. Referring, therefore, to Fig. 4, it will be seen that normally the spring $o$ will be held compressed, ready to partly turn or project the ring around the collar as soon as the stop $s$ is withdrawn. It should also be understood (referring to Figs. 2 and 4) that the passive friction of the shaft $a$ in its bearings and the friction of its connections with the die will always greatly exceed the tension of the compressed spring $o$, so that while the ring is arrested by the stop $s$ (see Fig. 4) the reaction of the spring cannot turn the collar $g$ and its shaft backward, so as to allow the spring to expand, and thus release its pressure against the ring $m$ in the direction of revolution toward the stop, as indicated by the arrow in Fig. 1.

Now, referring to the drawings, it will be understood that normally the fly-wheel $a$ will be revolving freely on the shaft close to the friction-collar $d$, and that the shaft $a$, with the friction-collar $d$ and abutting collar $g$ and their connections, will be at rest. Furthermore, the spring $o$ will be compressed, tending to turn the ring in the direction of revolution; but the revolution of the ring will be prevented by the stop $s$, and in this position of parts the pawls $k\ k$ will be relaxed and inclined, as seen best in Fig. 2, with their cam ends just approaching or resting in light contact with the hardened ring $f$ on the hub of the fly-wheel. (In this consideration disregard the secondary pawls $v$, seen in Figs. 2 and 4, whose functions will be hereinafter described.) It will therefore now be seen (referring to Figs. 2 and 4) that if the stop $s$ be withdrawn the expansion of the spring $o$ will move the ring in the direction of revolution, as indicated by the arrows, and this will tend to straighten the pawls and press their cam ends against the hub of the fly-wheel. The hub now engaging with the wedging-pawls will tend to further straighten the pawls with a powerful wedging toggle action, which, reacting longitudinally or axially of the shaft, will force the opposite side of the hub against the friction-collar $d$, and thus clutch the wheel to the shaft with a powerful frictional grasp, which will increase with the increase of resistance on the shaft, thus tending to tighten itself the more the resistance is offered to it, and thus forming an almost positive and instantaneous clutch. The fly-wheel, with the shaft and collars $d\ g$, with the pawls $k\ k$ and ring $m$, will now all revolve together until the stop $s$ is again projected, which will engage the projection $r$, and thus arrest the ring $m$. After the arrest of the ring $m$ the collar $g$ will continue to revolve for a mere instant of time, sufficient to compress the spring $o$ up against the projection $p$, and (referring to Fig. 2) to swing the pivotal ends of the pawls $k$ on the screws $l$ as a fulcrum, thereby relaxing the pawls and bringing all parts back in their normal positions, and thus unclutching the wheel from the shaft, so that the wheel will now continue to revolve freely, while the shaft, &c., remains at rest; hence by withdrawing the stop $s$ and immediately releasing it the shaft and its attachments will make one revolution and stop at a definite point at the end of the revolution, as usual in die-presses. Now, in order to prevent the momentum of the shaft $a$ and its connected parts, and also to prevent any springing action of the dies from revolving or continuing the motion of the shaft beyond the stopping-point, I employ a second set of pawls, $v\ v$, which I may term the "secondary" or "reverse" pawls, which are pivoted to the collar g and approach the hub of the fly-wheel in the same manner as the main pawls k k, but at a reverse inclination, as shown in Fig. 2. These pawls v v have no connection with the ring m, but are continually pressed by a light spring, w, against the ring f on the fly-wheel hub, as fully shown in Fig. 2. It will therefore be seen that these secondary pawls will have no action when the main pawls act, and they will at all times allow the fly-wheel to revolve forward, as indicated in Fig. 1, which is the direction in which the secondary pawls slip. If, however, this collar g, with its pawls, should be revolved in the same direction independently of the fly-wheel, the secondary pawls v v would then be momentarily engaged with the fly-wheel and compelled to revolve uniformly with it, so that by this means the shaft cannot "get ahead" of the wheel or make revolutions independently of the fly-wheel. It may also be seen by referring to Fig. 2 that if it is desired to turn the shaft backward to adjust the position of the dies, or for other purposes, it may be done by taking hold of the fly-wheel after its driving-belt is stopped, and thus turning back the wheel, in which direction the secondary pawls v will automatically engage, while the main pawls k will slip, thus enabling the shaft and its attachments to be turned back to any position desired. It will be understood that as the pawls are made of hardened steel, or have their cam ends hardened, and as they bear on the hardened-steel ring inserted in the fly-wheel hub, the action of these parts is rendered durable, and sticking and denting of the engaging surfaces prevented.

It may now be appreciated that my improved clutch is not only very simple, inexpensive, and strong in its construction, and contains few parts, easily put together and replaced, but its clutching action is instantaneous and powerful, and at the same time it exerts its clutching pressure altogether lengthwise of the shaft by forcing the hub of the wheel against a collar, which is a novel and advantageous feature which distinguishes my invention.

It may be understood that I do not limit myself to a technical friction-pawl or inclined link-bar between the hub of the wheel and the abutting collar, as any similar device having a similar wedging action to wedge the wheel axially against the opposite friction-collar may of course be used without altering the principle or action of my invention. Neither do I confine myself to the ring m and its adjuncts for operating the pawls, as any other suitable device may be used.

I am aware that it is not new in itself to make a friction-clutch with a wedging pawl-bar arranged between a friction-collar on the shaft and a wheel or hub thereon, the straightening of the bar acting to powerfully wedge the hub against the collar in a line parallel with the shaft. In such former instances, however, this construction has been employed merely as a friction ratchet-clutch to act by power transmitted through the shaft itself, so that the forward driving strain on the shaft would tighten the pawl-bar and cause the clutch to hold, while the reverse motion of the shaft would relax the pawl-bar and let the clutch slip.

In my novel combination of parts I employ a manipulating or operating device for tightening and loosening the wedging pawl-bar independent of the shaft, which distinguishes my clutch from those referred to.

What I claim as my invention is—

1. The combination, with the shaft a and collar d and pawl or pawls k, pivotally connected with the shaft, of the wheel or hub c, arranged on the shaft between the collar and the free ends of the pawls, and an operating device independent of the shaft to force the pawls to and from the wheel, whereby the wheel is wedged against and relaxed from the collar d, substantially as shown and described.

2. The combination, with the shaft a, collar d, and wheel or hub c, of the abutting collar g and pawl or pawls k, arranged between the wheel and abutting collar, pivoted on one and having a curved cam-face to bear against the other, substantially as shown and described.

3. The combination, with shaft a, collar d, and wheel or hub c, of the wedging pawl or pawls k, pivoted on the shaft or an abutment thereof, and bearing against the wheel, and the partly-rotary ring m, engaged with the pawls for operating the same, substantially as set forth.

4. The combination of the shaft a, collar d, and wheel or hub c with the wedging pawl or pawls k, operating-ring m, spring o, projection r, and stop s, arranged and operating substantially as and for the purpose set forth.

5. In a friction-clutch, the combination, with a shaft and friction-collar thereon, and a fly-wheel or its equivalent revolving on the shaft with its side approaching said collar, of a second collar carrying a wedging device for locking the fly-wheel and shaft together, and a second wedging device acting in a reverse direction, whereby the momentum of the shaft is overcome, substantially as described.

6. The combination, with shaft a, collar d, and wheel or hub c, engaged by a forwardly-acting clutch, of the reverse pawl or pawls v, arranged and operating substantially as and for the purpose set forth.

7. The combination, with shaft a, collar d, and wheel or hub c, of the reverse-pawl v and spring w, arranged and operating substantially as and for the purpose set forth.

8. The combination, with the shaft a, collar d, and wheel or hub c and collar g, of the pawls k and v, pivoted on the collar g, and bearing against the wheel at reverse inclinations, substantially as and for the purpose set forth.

9. The combination, with the shaft $a$, and collar $d$, and wedging pawl or pawls $k$, pivotally connected with the shaft, of the wheel or hub $c$, arranged on the shaft between the collar and the pawls, and provided with the bearing-ring $f$, substantially as shown and described.

EDMUND JORDAN.

Witnesses:
JNO. E. GAVIN,
H. C. KUDLICH.